United States Patent [19]
Tilby et al.

[11] Patent Number: 5,240,192
[45] Date of Patent: Aug. 31, 1993

[54] CUTTING ROLL WITH REMOVABLE BLADE

[76] Inventors: Sydney E. Tilby, 4688 Boulderwood Drive, Victoria, B. C., Canada, V8Y 2P8; Allan Thorn, 414 Tamarac, Victoria, B. C., Canada, V8X 3X1

[21] Appl. No.: 637,348

[22] Filed: Jan. 4, 1991

[51] Int. Cl.⁵ .................. A01D 55/00; B02C 4/30
[52] U.S. Cl. ................ 241/292.1; 241/294; 144/174; 144/230
[58] Field of Search ............ 241/294, 292.1, 235; 144/230, 174

[56] References Cited

U.S. PATENT DOCUMENTS

| | | |
|---|---|---|
| 420,522 | 2/1890 | Sweet .................. 144/174 |
| 605,293 | 6/1898 | Madden . |
| 608,630 | 8/1898 | Wright . |
| 616,177 | 12/1898 | Adelsperger . |
| 623,753 | 3/1899 | Winchell . |
| 623,754 | 3/1899 | Winchell . |
| 627,882 | 6/1899 | Sherwood . |
| 632,789 | 9/1899 | Remy . |
| 657,341 | 9/1900 | Dyer . |
| 670,037 | 3/1901 | Sherwood . |
| 675,758 | 6/1901 | Sherwood . |
| 684,492 | 10/1901 | Adamson . |
| 707,531 | 8/1902 | Adamson . |
| 1,689,387 | 10/1928 | Heimlich . |
| 2,144,986 | 1/1939 | Miller .................. 144/230 X |
| 2,706,312 | 4/1955 | Bobkowicz . |
| 3,424,611 | 1/1969 | Miller . |
| 3,424,612 | 1/1969 | Miller . |
| 3,464,877 | 9/1969 | Miller et al. . |
| 3,464,881 | 9/1969 | Miller et al. . |
| 3,467,416 | 9/1969 | Gourley .................. 144/230 X |
| 3,566,944 | 3/1971 | Tilby . |
| 3,567,510 | 3/1971 | Tilby . |
| 3,567,511 | 3/1971 | Tilby . |
| 3,690,358 | 9/1972 | Tilby . |
| 3,698,459 | 10/1972 | Tilby . |
| 3,721,567 | 3/1973 | Miller et al. . |
| 3,796,809 | 3/1974 | Miller et al. . |
| 3,873,033 | 3/1975 | Tilby . |
| 3,946,474 | 3/1976 | Hahn et al. ............... 144/230 X |
| 3,976,498 | 8/1976 | Tilby . |
| 3,976,499 | 8/1976 | Tilby . |
| 4,009,742 | 3/1977 | Ziegelmeyer ............ 144/230 |
| 4,025,278 | 5/1977 | Tilby . |
| 4,151,004 | 4/1979 | Vukelic . |
| 4,312,677 | 1/1982 | Tilby et al. . |
| 4,449,556 | 5/1984 | Colton .................. 144/230 |
| 4,572,741 | 2/1986 | Mason . |
| 4,636,263 | 1/1987 | Cundiff . |
| 4,702,423 | 10/1987 | Pinto . |
| 4,743,307 | 5/1988 | Mason . |
| 4,816,075 | 3/1989 | Gruenewald . |
| 5,005,619 | 4/1991 | Jensen .................. 144/230 |

Primary Examiner—Mark Rosenbaum
Assistant Examiner—Frances Chin
Attorney, Agent, or Firm—Jansson & Shupe, Ltd.

[57] ABSTRACT

A cutting roll of the type with a cylindrical base member and at least one substantially axially-parallel blade attached thereto for separation of sugarcane, sweet sorghum, and the like. Grooves in the base have serrated walls engaging serrated sides of blade members, and wedging members secure the blades in proper radial adjustment in the grooves. A plurality of blade segments in each groove and a slight angling of the serrations allows blade rotation and provides a highly accurate and easily adjustable cutting roll.

31 Claims, 6 Drawing Sheets

CUTTING ROLL WITH REMOVABLE BLADE

FIELD OF THE INVENTION

This invention is related generally to separation systems for sugarcane, sweet sorghum, and the like, and, more particularly, to the separation of such plants into their constituents. The invention is also related to cutter rolls.

BACKGROUND OF THE INVENTION

General Background

The stalk of the sugarcane plant includes an outer rind which is a hard, wood-like fibrous substance. The rind surrounds a central core of pith, which bears nearly all of the sugar juice from which various sugar products are made. The outer surface of the rind has a thin, waxy epidermal layer, referred to herein as "dermax."

Conventional sugarcane industry practices until today have utilized sugarcane primarily only for its sugar content. Such industry practices have involved chopping and crushing sugarcane stalks to remove the sugar juice, with the waste solids (bagasse) being used primarily only as fuel, mainly in sugar production operations.

Although such practices have been virtually uniform throughout the industry, it has been recognized that a number of very useful products may be produced from sugarcane if the sugarcane stalk is first separated into its rind, pith and dermax constituents. The many useful end-products made possible by such separation can provide great economic benefit. Such separation also provides significant efficiencies in the production of sugar. Earlier efforts involving stalk separation, though not necessarily related to sugarcane, are reflected in the following U.S. patents:

U.S. Pat. No. 605,293 (Madden)
U.S. Pat. No. 608,630 (Wright)
U.S. Pat. No. 616,177 (Adelsperger)
U.S. Pat. No. 623,753 (Winchell)
U.S. Pat. No. 623,754 (Winchell)
U.S. Pat. No. 627,882 (Sherwood)
U.S. Pat. No. 632,789 (Remy)
U.S. Pat. No. 657,341 (Dyer)
U.S. Pat. No. 670,037 (Sherwood)
U.S. Pat. No. 675,758 (Sherwood)
U.S. Pat. No. 684,492 (Adamson)
U.S. Pat. No. 707,531 (Adamson)
U.S. Pat. No. 1,689,387 (Heimlich)
U.S. Pat. No. 2,706,312 (Bobkowicz).

Even though stalk separation efforts began as early as the late 1800's, essentially the entire sugarcane industry continued in the conventional process noted above, involving chopping and crushing of the whole stalk to extract sugar juice.

Technology in this field remained rather dormant until the 1960's, when a resurgence of development activity began, substantially all related to what has been known in the industry as the Tilby system, a cane separation system named after the principal originator, Sydney E. ("Ted") Tilby.

Broadly speaking, the Tilby system includes a multi-step operation executed by various portions of a cane separtor machine. Sugarcane billets, i.e., cut lengths of cane stalk preferably about 25-35 cm long, are driven downwardly over a splitter to divide them lengthwise into semi-cylindrical half-billets. The two half-billets of a split billet are then processed individually by symmetrical downstream portions of the separator machine.

The first of such downstream portions of the separator is a depithing station which includes a cutter roll and holdback roll for milling pith away from the rind of the half-billet while simultaneously flattening the rind. The next downstream portion is a dermax removal station from which the rind emerges ready for subsequent processing in a variety of ways, including slitting, chipping and/or many other processing steps. The pith is conveyed away from the separator machine to an extraction station where its sugar juice is removed.

A significant number of patents related to the Tilby system and improvements in such system have been granted, beginning in the 1960's. These and other fairly recent United States patents related generally to sugarcane processing are as follows:

U.S. Pat. No. 3,424,611 (Miller)
U.S. Pat. No. 3,424,612 (Miller)
U.S. Pat. No. 3,464,877 (Miller et al.)
U.S. Pat. No. 3,464,881 (Miller et al.)
U.S. Pat. No. 3,566,944 (Tilby)
U.S. Pat. No. 3,567,510 (Tilby)
U.S. Pat. No. 3,567,511 (Tilby)
U.S. Pat. No. 3,690,358 (Tilby)
U.S. Pat. No. 3,698,459 (Tilby)
U.S. Pat. No. 3,721,567 (Miller et al.)
U.S. Pat. No. 3,796,809 (Miller et al.)
U.S. Pat. No. 3,873,033 (Tilby)
U.S. Pat. No. 3,976,498 (Tilby)
U.S. Pat. No. 3,976,499 (Tilby)
U.S. Pat. No. 4,025,278 (Tilby)
U.S. Pat. No. 4,151,004 (Vukelic)
U.S. Pat. No. 4,312,677 (Tilby et al.)
U.S. Pat. No. 4,572,741 (Mason)
U.S. Pat. No. 4,636,263 (Cundiff)
U.S. Pat. No. 4,702,423 (Pinto)
U.S. Pat. No. 4,743,307 (Mason)
U.S. Pat. No. 4,816,075 (Gruenewald).

The Tilby system, when finally fully commercialized, can provide substantial outputs of several high-value products. This greatly increases cash yields per ton of sugarcane, a factor of significant importance to an industry in which profitability in recent years has been marginal at best. This is important generally, but is of particular importance to the many developing countries in which a flourishing sugarcane industry would be a boon to economic growth and stability.

Considering that sugarcane is one of the most rapidly growing, easily developed, and readily accessible sources of biomass, full commercialization of the Tilby system can significantly reduce dependence on forests and on certain other crops and resources. Among the products which can be made from sugarcane constituents separated by the Tilby system are sugar in an increased variety of forms, foods and food additives, animal feeds, a variety of wood products and building materials, alcohol for a variety of purposes, paper and other pulp-containing products, and a variety of specialty products.

While substantial technical development has occurred over a period of many years with respect to the Tilby system, a number of difficult and critical problems have remained. The failure to overcome such problems has prevented full commercialization of the Tilby system. The invention described and claimed herein is directed to the solution of certain of these problems.

SPECIFIC BACKGROUND

Some cutting rolls for use in removing pith from half-billets are disclosed in certain of the above U.S. patents, including the following:

U.S. Pat. No. 3,567,510 (Tilby)
U.S. Pat. No. 3,567,511 (Tilby)
U.S. Pat. No. 3,690,358 (Tilby)
U.S. Pat. No. 3,976,498 (Tilby et al.)
U.S. Pat. No. 4,151,004 (Vukelic)
U.S. Pat. No. 4,312,677 (Tilby et al.)
U.S. Pat. No. 4,572,741 (Mason)
U.S. Pat. No. 4,743,307 (Mason).

The cutting rolls used for depithing half-billets are typically fairly wide, such that they span the width of the path of billet flow in the separator apparatus.

Cutting rolls of the prior art included cylindrical base members with circumferentially-spaced grooves in which blades were adjustably secured. Blades in such grooves were held in place by various fasteners and wedging devices.

The cutting roll devices of the prior art have exhibited a number of significant problems and deficiencies. Some are related to inefficient pith and dermax removal. Others are related to difficulty in blade adjustment. Still others are related to safety, a significant concern considering the high-speed at which such cutting rolls are operated.

A number of problems manifest themselves because the blades on the cutting roll invariably become worn or damaged. Repair may be accomplished by sharpening a blade while on the roll only until repeated sharpening decreases the effective diameter of the cutting roll, creating a larger gap between it and the holdback roll and allowing half-billets to pass between them without complete pith removal.

These problems are exacerbated by the fact that blades tend to wear unevenly across the length of a cutting roll. The middle portions tend to wear much faster. Repeated blade sharpenings decrease the cutting roll diameter, enlarging the distance between it and the hold-back roll. The effect of either action is incomplete removal of pith from the half-billets.

In cutting rolls of the prior art, blade-wear problems, incomplete pith removal, and related downtime were significant problems. Entire blades may require replacement at a considerable expense after very little use. Once worn past a certain point there is no further use for a blade. Through normal use and repeated sharpening, a blade is no longer properly dimensioned for effective use in a cutting roll of the prior art. The tendency is to discard blades at great cost.

Another major problem with cutting rolls of the prior art is the considerable difficulty encountered in attempting to secure a blade at a desired adjustment in its groove. Holding the blades at the proper location was difficult and time-consuming at best. Deferral of sharpening and adjustment to avoid such problems, however, tends to result in incomplete or improper pith removal. Significant blade slippage can also occur between adjustments.

Because of the high speeds at which cutting rolls rotate and the manner in which blades have been secured to a cylindrical base roll, safety has been a concern. Blades can fly of the base member, at considerable risk to workers in the area. Such loss of control occurs most when blades made from high-strength materials are used, since certain of such materials tend to have surfaces more slippery than ordinary metal surfaces. In some cases, blades secured at their opposite ends can bow outwardly, causing further risk and inaccuracies in operation.

In summary, a considerable number of drawbacks and problems exist with respect to cutting rolls of the prior art for use in sugarcane separation systems. There is a need for an improved cutting roll to fully utilize the advantages inherent in the Tilby sugarcane separation system.

OBJECTS OF THE INVENTION

It is an object of this invention to provide an improved cutting roll, overcoming some of the problems and shortcomings of the prior art.

Another object of this invention is to provide an improved cutting roll for sugarcane separation systems.

Another object of this invention is to provide an improved cutting roll for sugarcane separation systems such that blade wear is uniform across the entire length of the roll.

Another object of this invention is to provide an improved cutting roll for sugarcane separation systems such that if a blade is damaged it need not be replaced in its entirety.

Another object of this invention is to provide an improved cutting roll such that the blade may be sharpened repeatedly without changing the effective diameter of the cutting roll.

Another object of this invention is to provide an improved cutting roll for sugarcane separation systems such that the blade may be repositioned radially on the roll to compensate for wear and repeated sharpening.

Another object of this invention is to provide an improved cutting roll for sugarcane separation systems such that blades worn too much for one operation may be used elsewhere within the system and help lower production costs.

Another object of this invention is to provide an improved cutter roll for sugarcane separation systems such that the blade may be sharpened or replaced quickly without significant downtime and increased production costs.

These and other important objects will be apparent from the descriptions of this invention which follow.

SUMMARY OF THE INVENTION

This invention is an improved cutting roll, particularly a cutting roll for use in sugarcane separation systems. The invention overcomes certain problems and deficiencies, including those outlined above.

An important aspect of this invention is its improved combination of blades and blade-mounting means. The inventive arrangement allows the blade means to be moved radially within a groove with ease to maintain roll diameter and compensate for wear. The arrangement also holds the blade means firmly in place. A wide variety of advantages will become apparent from the description which follows.

This invention is a cutting roll having a cylindrical base member and at least one substantially axially-parallel blade attached thereto, including (1) a substantially axially-parallel groove in the base member having a substantially radial wall with parallel serrations therealong, (2) a blade having an outer edge and first and second sides, the first side serrated to mate with the serrated groove wall, and (3) means to force the first side of the blade toward the serrated groove wall and removably secure the blade in the groove with the proper radial adjustment. The forcing means preferably includes means to wedge the blade against the serrated groove wall.

In certain preferred embodiments, in addition to having a serrated wall the groove has a second substantially radial wall which is angled with respect to the non-serrated side of the blade such that the serrated groove wall and non-serrated blade side are convergent along a radius. The blade is held against the serrated wall of the groove by a wedge member bearing against the non-serrated groove wall and the non-serrated side of the blade, and by means holding such wedge member in that position.

In certain preferred embodiments, the non-serrated groove wall and non-serrated blade slide are convergent in a direction toward the axis of the base member, and the holding means is a double-threaded screw engaging the base member with the wedge. In such situations, the wedge member therein preferably has first and second wedge surfaces substantially parallel to the non-serrated groove wall and the non-serrated blade side, respectively.

In certain highly preferred embodiments, the groove has a groove bottom and the wedge member includes a bearing portion and a main portion. The bearing portion contacts the groove bottom and the non-serrated side of the blade. The main portion engages the bearing portion and the non-serrated groove wall. In such embodiments, it is preferred that the groove bottom have means thereon to maintain constant orientation of the bearing portion despite changes in the radial dimension of the blade.

In some preferred embodiments, the non-serrated groove wall and the non-serrated blade side are convergent in a direction away from the axis of the base. The holding means is a set screw engaging the wedge and bearing the base member. The wedge member has first and second wedge surfaces substantially which are parallel to the non-serrated wall of the groove and the non-serrated blade side, respectively.

In such embodiments, it is preferred that the groove have a groove bottom, and that the wedge member have a bearing portion and an expansion portion. The bearing portion contacts the groove bottom and the non-serrated side of the blade. The expansion portion has a proximal end in threaded engagement with the bearing portion of the wedge and a distal end engaging the non-serrated wall of the groove. The expansion portion also forms the holding means. In such embodiments, it is preferred that the groove bottom have means thereon to maintain constant orientation of the bearing portion despite changes in the radial dimension of the blade.

With respect to the direction of base member rotation, it is preferred that the serrated wall of the groove be a trailing wall. The groove and wedge member preferably define a void forward of the blade.

In preferred embodiments, the leading outer edge of the blade, as determined with respect to the direction of base member rotation, has a greater radial distance from the axis of the cylinder than any other portion of the outer edge. That is, the trailing outer edge has a lesser radius, such that drag is minimized.

In preferred embodiments, the blade has a plurality of blade segments arranged end-to-end in each groove, each secured with a separate wedge member. The aforementioned groove wall serrations are angled with respect to the axis of the cylinder, such that movement of the blade segments along the groove wall serrations while in engagement therewith moves the blade segments radially outwardly. In highly preferred embodiments, the groove wall serrations are angled such that over the length of the groove the serrations increase in radius by a distance equal to the width of one serration.

As already noted, the Tilby sugarcane separation system has certain inherent advantages over the prior art. The cutting rolls of this invention allow those advantages to be more fully realized.

For one thing, the engagement of a serrated groove wall with a serrated blade side, as described above, addresses the problems of blade wear and sharpness in a novel fashion. The angling of the groove-wall serrations and the use of multiple blade segments end-to-end within each groove allows incremental rotation of the blade segments, ensuring equal wear and maintaining proper blade distance from the holdback roll.

In such incremental rotation, each blade segment is moved along the groove wall by a distance equal to the width of a blade segment. This dislodges the last blade segment from the groove at the end of the groove. When it is removed, it may be reinserted in the groove at the lead end of the groove as the first segment, but at a position one serration above the others. Sharpening of the blade (that is, of the aligned blade segments) may then proceed with the blade segments in place. The sharpening operation itself does not form part of this invention, and may be carried out by any suitable means.

The primary benefit of this inventive configuration is that the effective distance between the cutting and holdback rolls remains the same despite a tendency for uneven blade wear and the effects of repeated sharpening. A cost savings is also realized through the use of multiple blade segments. Whereas with the prior art, if a portion of the blade was damaged or somehow rendered ineffective with respect to pith removal the entire blade was replaced. With the cutting roll of the present invention, only that blade segment damaged need be replaced; a new blade segment is simply inserted at the end of the groove to replace it.

Likewise, when blades of the prior art became worn to the extent that pith was no longer effectively removed, the entire blade was discarded at considerable cost. With the present invention, once blade segments used in conjunction with the pith removal cutting roll are worn to a certain degree they may be used in similar cutting rolls for dermax removal, further increasing efficiency and lowering cost of production.

In preferred embodiments of this invention, each blade segment is paired with its own wedge member. Centrifugal force generated by the high-speed rotation of the cutting roll requires that each blade segment be mated securely with the serrated groove wall. Optimal blade security is achieved when each blade segment is held in the groove with its own wedge in threaded engagement with the cutting roll.

This invention has been described in connection with a sugarcane separation system. However, the invention has application beyond those described above, including but not limited to other plant materials having a woody rind and relatively soft internal pith.

DETAILED DESCRIPTIONS OF PREFERRED EMBODIMENTS

Figure 1:
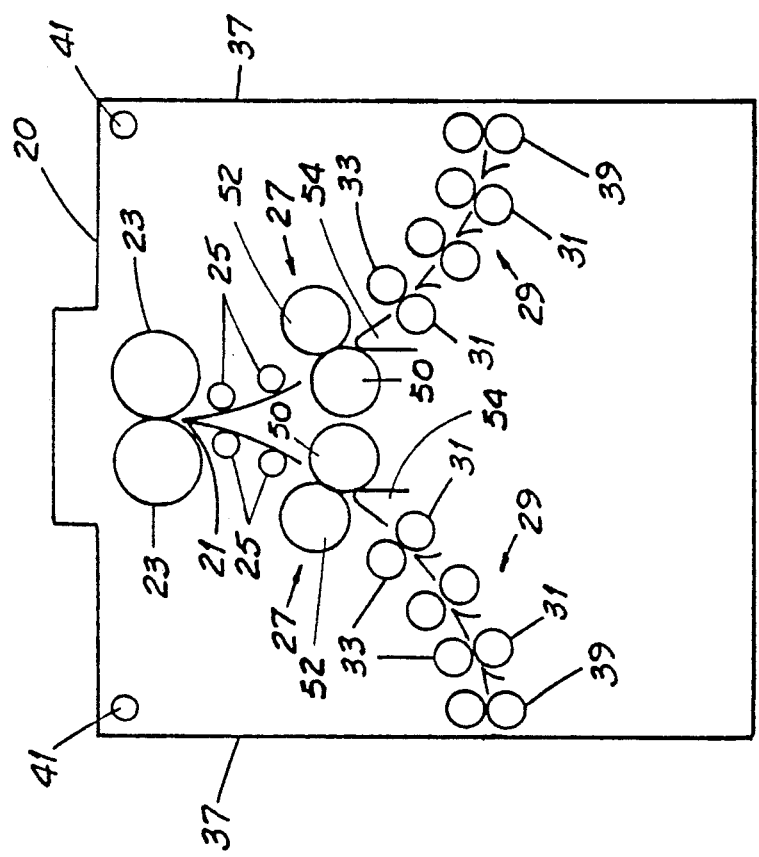
FIG. 1 is a front elevation view of a sugarcane separation system including a cutting roll in accordance with this invention.

This invention relates to improvements in a cutting roll 50, such as that included in the sugarcane separation apparatus illustrated schematically in FIG. 1. Improved cutting roll 50 is illustrated in detail in FIGS. 2-5D.

FIG. 1 shows a tower-like separator unit 20 used for splitting and processing sugarcane billets. As known in the prior art, separator unit 20 is symmetrical in a "mirror-image" arrangement, the two sides serving to process the half-billets resulting from billet splitting. The two sides of separator unit 20, as is known in the prior art, include portions mounted on wings 37 which can pivot upwardly about pivots 41 to facilitate servicing of unit 20.

Separator unit 20 receives whole billets of sugarcane, sweet sorghum, or the like end-first from above. Such billets are forced downwardly onto a splitting knife 21 by a pair of feed rolls 23. This splits the billets longitudinally into half-billets. Each half-billet, with its interior pith now exposed, moves past rotating control brushes 25 into a depithing station 27, which includes cutting roll assembly 50 and a coacting hold-back roll 52. At depithing station 27, the sugar-bearing pith of the half-billet is cut away from the half-billet rind in fairly small pieces by cutting roll assembly 50 and, at the same time, the rind is flattened.

Figure 2:
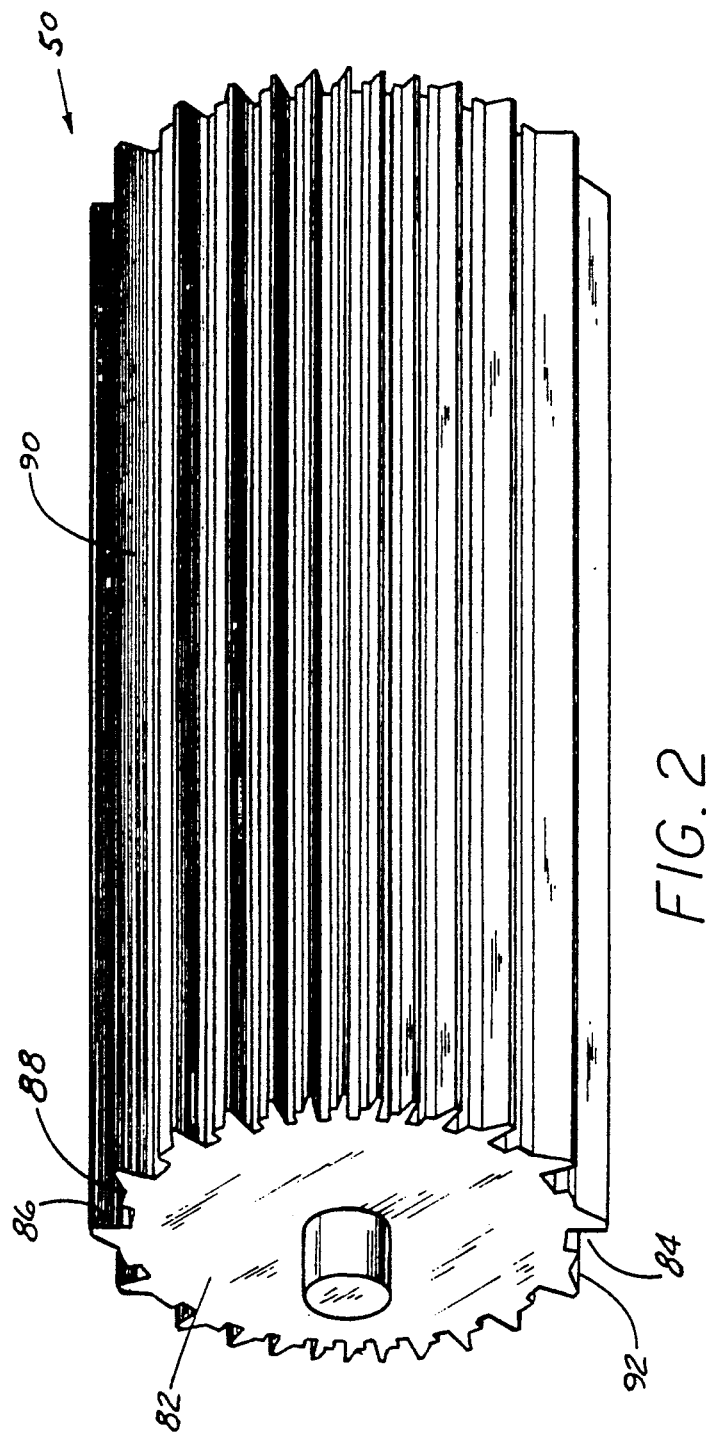
FIG. 2 is a full perspective view of a preferred cutting roll base member.

As best shown in FIG. 2, cutting roll 50 includes cylindrical base member 82, which has a plurality of longitudinal grooves 84 which are substantially parallel to the axis of rotation of base member 82. Each groove 84 is defined by first groove wall 86 and second groove wall 88, defining void 92. First groove wall 86 has a plurality of parallel serrations 90 extending therealong.

Figure 3:
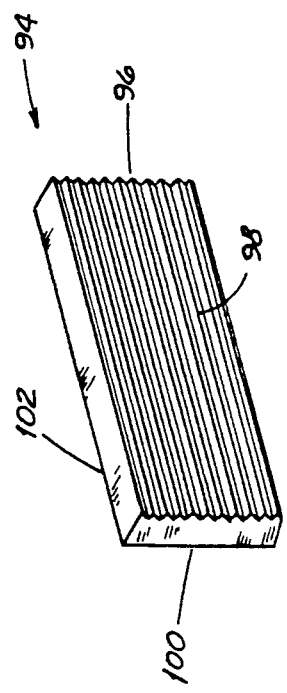
FIG. 3 is a full perspective view of a preferred blade segment engageable with the base member.

As shown in FIG. 3, blade segment 94 has a plurality of parallel serrations 96 on a first side 98, which mate with parallel serrations 90 on first groove wall 86. Blade segment 94 has a second side 100 and an outer edge 102, which has a leading edge with respect to the direction of base member rotation and is at a greater radial distance from the axis of the cylinder then any other portion of outer edge 102.

Figure 4:
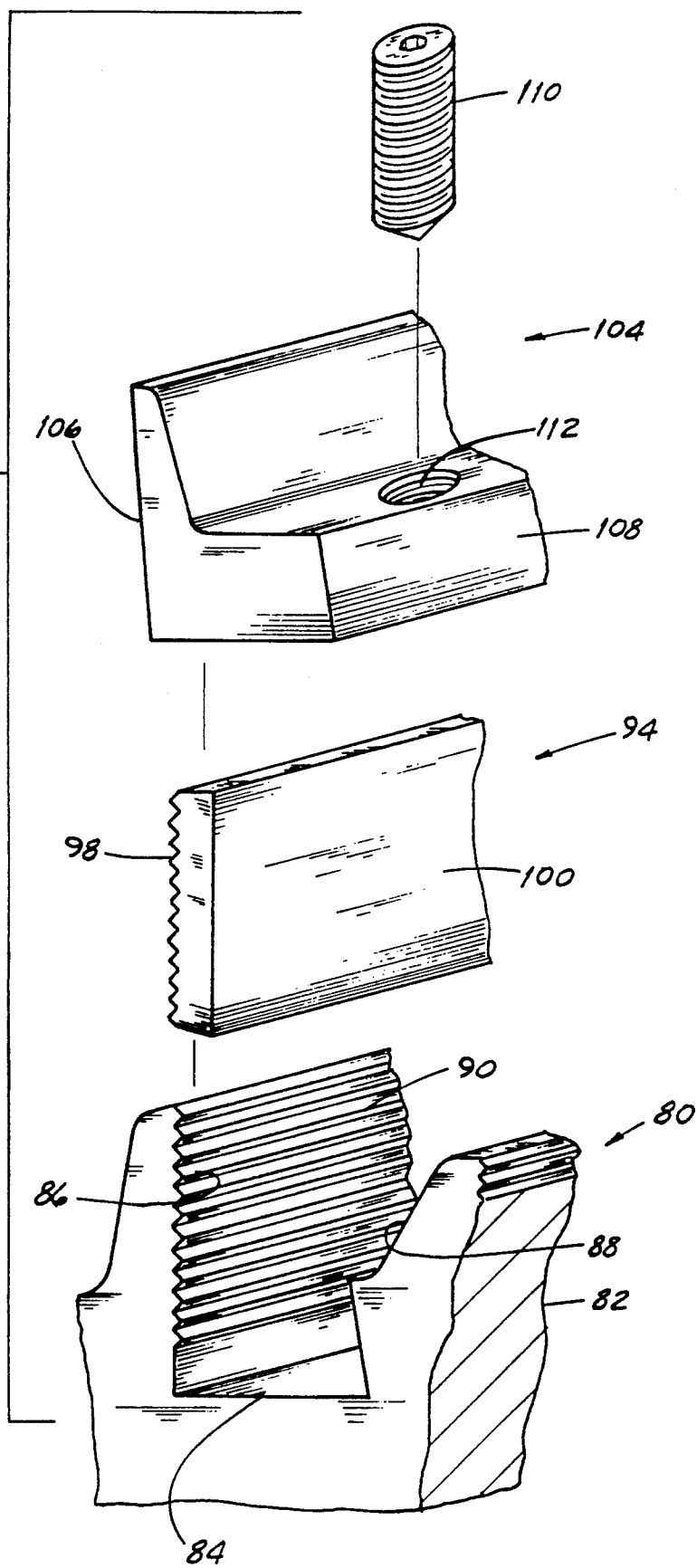
FIG. 4 is an exploded perspective view of a portion of a preferred cutting-roll groove, blade segment, and wedge.

As best shown in FIG. 4, serrated first side 98 of blade segment 94 is mated with and held against first groove wall 86 by wedge 104. When wedge 104 is placed in groove 84, the first wedge surface 106 is against second blade side 100, and second wedge surface 108 is against second groove wall 88. As shown in FIG. 4, wedge 104 is held against second groove wall 88 and second blade side 100 by screw 110 threaded through opening 112, engaging wedge 104 and groove bottom 84. In one preferred embodiment, shown in FIG. 5A, second groove wall 88a and second blade side 100 are convergent toward the axis of base member 82. The first and second wedge surfaces, 106a and 108a, respectively, are parallel to second blade side 100 and second wall 88a, respectively. Double-threaded screw 110a engages base member 82 and wedge member 104a, drawing them together and holding the serrated side of blade segment in engagement with the serrated groove wall. Reverse rotation of double-threaded screw 110a loosens such engagement, allowing blade segment 94 to slide along the groove.

Figure 5A:
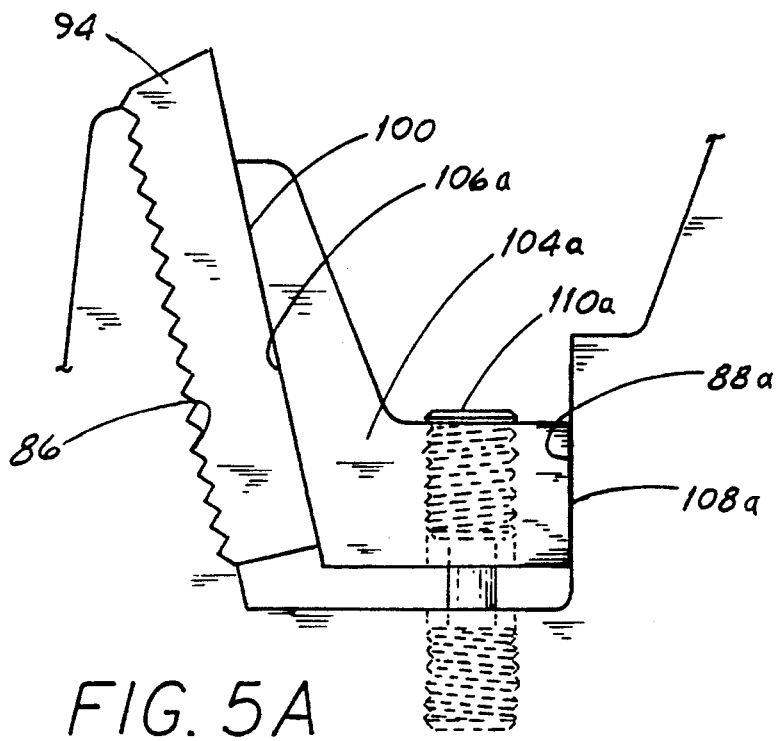
FIGS. 5A–5D are enlarged end elevation views of four preferred configurations of cutting-roll grooves, blade segments, and wedge members, the configuration of FIG. 5B being like that of FIG. 4.
Figure 5B:
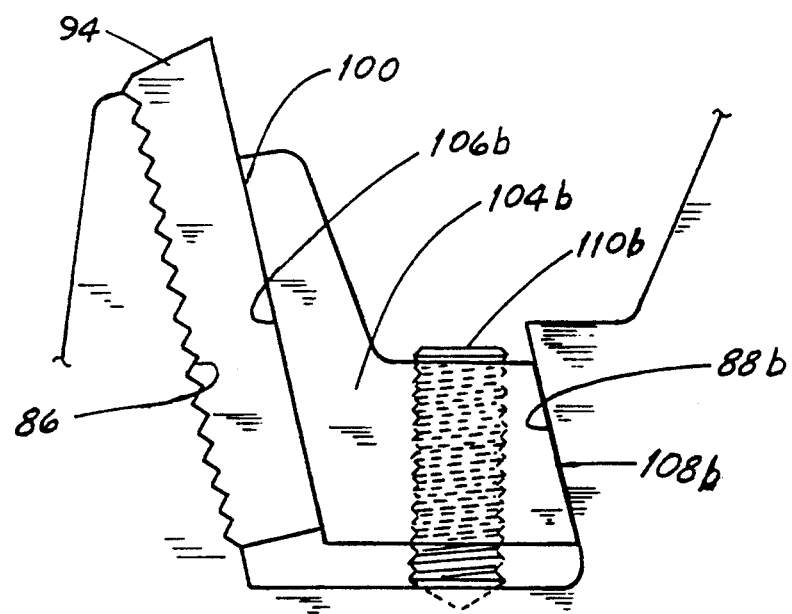

Another preferred embodiment is shown in FIG. 5B. Second groove wall 88b and second blade side 100 are convergent in a direction away from the axis of base member 82. First and second wedge surfaces 106b and 108b, respectively, are substantially parallel to second blade side 100 and second groove wall 88b, respectively. Set screw 110b exerts spreading force between base member 82 and wedge member 104b, thereby holding wedge member 104b against blade segment 94 to maintain the serrated engagement. Partial withdrawal of set screw 110b loosens such engagement.

Figure 5D:
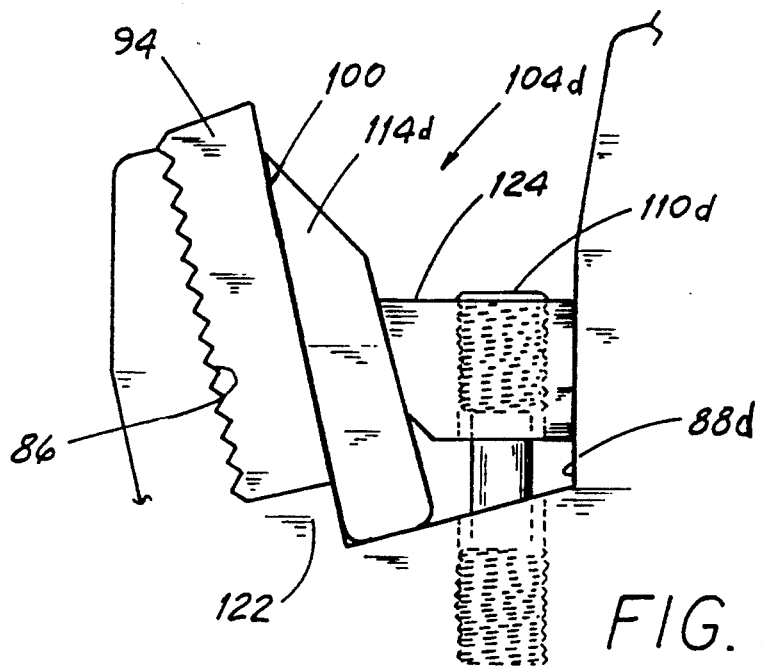
Figure 5C:
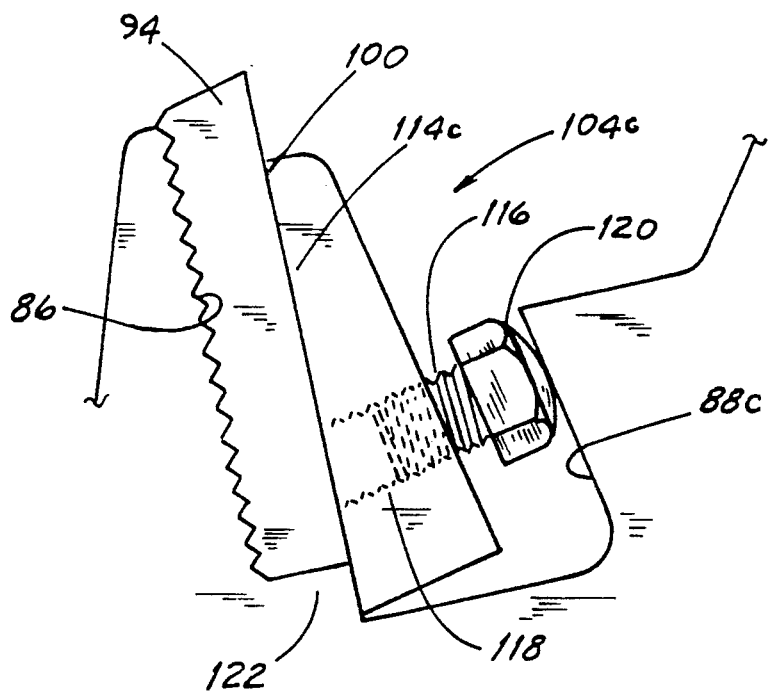

Another preferred embodiment is shown in FIG. 5C. Second blade side 100 and second groove wall 88c are convergent in a direction away from the axis of base member 82. Wedge member 104c has a bearing portion 114c which contacts the side of raised groove bottom 122 and second blade side 100. Raised groove bottom 122 is dimensioned to be as wide as blade segment 94 such that, when blade segment 94 is raised, the side of bearing portion 114c stays in contact with second blade side 100 and remains its orientation regardless of the radial position of blade segment 94. Wedge 104c also has an expansion portion 120 (a headed bolt). Bolt 120 has a threaded proximal end portion 116 in engagement with a threaded bolt hole 118, located in bearing portion 114c, and a distal end (the bolt head) engaged with second groove wall 88c. Turning bolt 120 in a direction withdrawing it from bearing portion 114c increases the force applied by bearing portion 114c on blade segment 94. This maintains the serrated engagement. Turning bolt 120 in the opposite direction loosens such engagement, allowing movement of blade segment 94 along the groove.

A highly preferred embodiment is shown in FIG. 5D. Second groove wall 88d and second blade side 100 are convergent in a direction toward the axis of base member 82. Wedge 104d has a bearing portion 114d and a main portion 124. Bearing portion 114d contacts second blade side 100 and the side of raised groove bottom 122. Raised groove bottom 122 is dimensioned as in the embodiment of FIG. 5C. Main wedge portion 124 engages bearing portion 114d and second groove wall 88d. Main portion 124 is held in engagement with base member 82 by a double-threaded screw 110d, which is identical to screw 100a seen in FIG. 5A.

In a highly preferred embodiment, blade segment 94 is about two inches in length and has a height of about ¾ inch when first used with the pith removal cutting roll of the present invention. Through repeated wear and sharpening the bits are reduced to a height of ½ inch, at which time they may be used in conjunction with the dermax removal cutting roll. Blade segment 94 may be made using a variety of materials; however, carbide steel is highly preferred.

Figure 6:
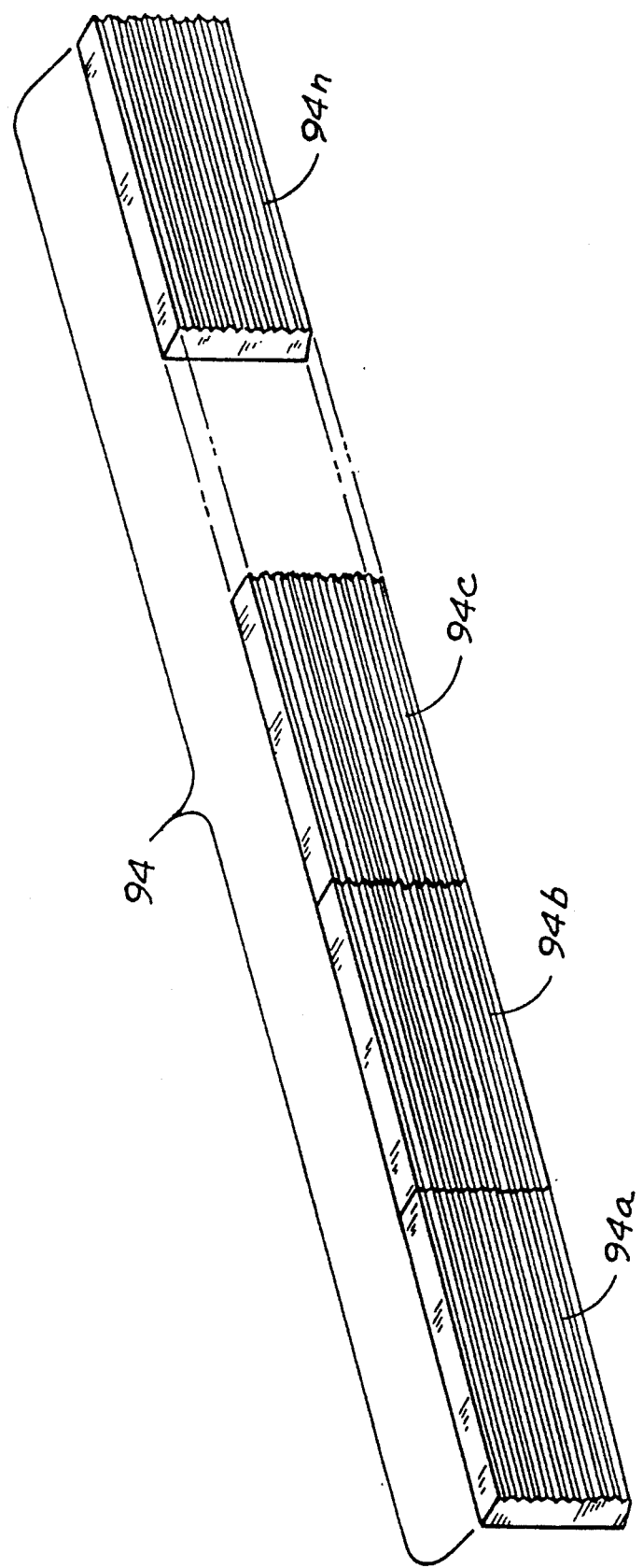
FIG. 6 is a reduced perspective representation of a group of blade segments forming a single blade, as in one cutting-roll groove.

As already indicated, a number of blade segments 94 make up the blade in each groove 84. This is illustrated by FIG. 6, which illustrates blade segments 94a through 94n in end-to-end alignment, as in a single groove.

The parts of this invention may be made using a variety of materials. Acceptable material choices will be apparent to those skilled in the art who are aware of this invention.

While the principles of this invention have been described in connection with specific embodiments, it should be understood clearly that these descriptions are made only by way of example and are not intended to limit the scope of the invention.

We claim:

1. In a cutting roll of the type with a cylindrical base member and at least one substantially axially-parallel blade attached thereto, the improvement comprising for each blade:
   a substantially axially-parallel groove in the base member having a first substantially radial wall with parallel serrations extending therealong;
   a blade having an outer edge and first and second sides, the first side being serrated to mate with the serrated wall of the groove, the blade having a plurality of blade segments arranged in end-to-end contact in the groove, the blade segments each having an outer edge, a first side and a second side aligned with the outer edges, first sides and second sides, respectively, of other blade segments such that the blade segments together form the outer edge, first side and second side of the blade;
   a blade anchor secured in the groove to force the first side of the blade toward the first wall of the groove to removably secure the blade in the groove in proper radial adjustment; and
   the groove wall serrations extending in a direction which is angled with respect to the axis of the cylinder, whereby the angle being such that over the length of the groove the serrations increase in radius by a distance up to the width of one serration, movement of blade segments along the groove wall serrations while engaged therewith moves such blade segments radially outwardly.

2. The cutting roll of claim 1 wherein the blade anchor comprises means to wedge the blade against the first wall of the groove.

3. The cutting roll of claim 2 wherein the wedging means comprises:
   the groove having a second substantially radial wall angled with respect to the second side of the blade such that the second wall and second side are convergent along a radius;
   a wedge member against the second wall and the second side of the blade; and
   means holding the wedge member against the second wall and second side.

4. The cutting roll of claim 3 wherein:
   the second wall and second side are convergent in a direction toward the axis of the cylinder; and
   the holding means is a double-threaded screw engaging the base member and the wedge member.

5. The cutting roll of claim 4 wherein the wedge member has first and second wedge surfaces substantially parallel to the second side of the blade and the second wall of the groove, respectively.

6. The cutting roll of claim 3 wherein:
   the second wall and second side are convergent in a direction toward the axis of the cylinder;
   the groove has a groove bottom;
   the wedge member includes a bearing portion and a main portion, the bearing portion contacting the groove bottom and the second side of the blade and the main portion engaging the bearing portion and the second wall of the groove; and
   the holding means is a double-threaded screw engaging the main portion of the wedge member.

7. The cutting roll of claim 6 wherein the groove bottom has means thereon to maintain constant orientation of the bearing portion despite changes in the radial dimension of the blade.

8. The cutting roll of claim 3 wherein:
   the second wall and second side are convergent in a direction away from the axis of the cylinder; and
   the holding means is a set screw engaging the wedge member and bearing against the base member.

9. The cutting roll of claim 8 wherein the wedge member has first and second wedge surfaces substantially parallel to the second side of the blade and the second wall of the groove, respectively.

10. The cutting roll of claim 3 wherein:
    the second wall and second side are convergent in a direction away from the axis of the cylinder;
    the groove has a groove bottom; and
    the wedge member includes a bearing portion and an expansion portion, the bearing portion contacting the groove bottom and the second side of the blade and the expansion portion having a proximal end in threaded engagement with the bearing portion and a distal end engaging the second wall of the groove, the expansion portion also forming the holding means,
    whereby unscrewing of the expansion portion with respect to the bearing portion draws the wedge member against the second wall and second side and screwing of the expansion portion into the bearing portion withdraws the wedge member from tight contact with the second wall and second side to allow unmating of the serrations.

11. The cutting roll of claim 10 wherein the groove bottom has means thereon to maintain constant orientation of the bearing portion despite changes in the radial dimension of the blade.

12. The cutting roll of claim 3 wherein the first wall of the groove is a trailing wall with respect to the direction of rotation, the groove and wedge member defining a void forward of the blade.

13. The cutting roll of claim 1 wherein the outer edge of the blade has a leading edge with respect to the direction of rotation which is at a greater radial distance from the axis of the cylinder than any other portion of the outer edge.

14. The cutting roll of claim 1 wherein the angle of the groove wall serrations is such that over the length of the groove the serrations increase in radius by a distance equal to the width of one serration, whereby the blade may be re-positioned after wear by moving the blade segments along the groove wall serrations while in engagement therewith by a distance equal to the width of one blade segment, removing the last blade segment, and reinserting it in the groove as the first segment in the groove in a radial position one serration beyond the others.

15. The cutting roll of claim 14 wherein the blade anchor comprises means to wedge the blade segments against the first wall of the groove.

16. The cutting roll of claim 15 wherein the wedging means comprises:
the groove having a second substantially radial wall angled with respect to the second sides of the blade segments such that the second wall and second sides are convergent along a radius;
at least one wedge member against the second wall and the second sides of the blade segments; and
means holding the wedge member against the second wall and second sides.

17. The cutting roll of claim 16 wherein there is one wedge member for each blade segment.

18. The cutting roll of claim 16 wherein:
the second wall and second sides are convergent in a direction toward the axis of the cylinder; and
the holding means is a double-threaded screw for each wedge member engaging the base member and such wedge member.

19. The cutting roll of claim 18 wherein each wedge member has first and second wedge surfaces substantially parallel to the second sides of the blade segments and the second wall of the groove, respectively.

20. The cutting roll of claim 16 wherein:
the second wall and second sides are convergent in a direction toward the axis of the cylinder;
the groove has a groove bottom;
each wedge member includes a bearing portion and a main portion, the bearing portion contacting the groove bottom and the second side of at least one of the blade segments and the main portion engaging the bearing portion and the second wall of the groove; and
the holding means is a double-threaded screw engaging the main portion of such wedge member.

21. The cutting roll of claim 20 wherein the groove bottom has means thereon to maintain constant orientation of the bearing portion despite changes in the radial dimensions of the blade segments.

22. The cutting roll of claim 16 wherein:
the second wall and second sides are convergent in a direction away from the axis of the cylinder; and
the holding means is a set screw engaging the wedge member and bearing against the base member.

23. The cutting roll of claim 22 wherein the wedge member has first and second wedge surfaces substantially parallel to the second sides of the blade segments and the second wall of the groove, respectively.

24. The cutting roll of claim 16 wherein:
the second wall and second sides are convergent in a direction away from the axis of the cylinder;
the groove has a groove bottom; and
each wedge member includes a bearing portion and an expansion portion, the bearing portion contacting the groove bottom and the second side of at least one of the blade segments and the expansion portion having a proximal end in threaded engagement with the bearing portion and a distal end engaging the second wall of the groove, the expansion portion also forming the holding means, whereby unscrewing of the expansion portion with respect to the bearing portion draws the wedge member against the second wall and second side and screwing of the expansion portion into the bearing portion withdraws the wedge member from tight contact with the second wall and second side to allow unmating of the serrations.

25. The cutting roll of claim 24 wherein the groove bottom has means thereon to maintain constant orientation of the bearing portion despite changes in the radial dimensions of the blade segments.

26. The cutting roll of claim 16 wherein the first wall of the groove is a trailing wall with respect to the direction of rotation, the groove and wedge member defining a void forward of the blade segments.

27. The cutting roll of claim 14 wherein the outer edges of the blade segments have leading edges with respect to the direction of rotation which are at a greater radial distance from the axis of the cylinder than any other portion of the outer edges.

28. In a sugarcane separation apparatus of the type having means for splitting billets and a cutter roll for removing the pith from the rind of such split billets, such cutter including a cylindrical base member and at least one substantially axially-parallel blade attached thereto, the improvement comprising for each blade:
a substantially axially-parallel groove in the base member having a first substantially radial wall with parallel serrations extending therealong;
a blade having an outer edge and first and second sides, the first side being serrated to mate with the serrated wall of the groove, the blade having a plurality of blade segments arranged in end-to-end contact in the groove, the blade segments each having an outer edge, a first side and a second side aligned with the outer edges, first sides and second sides, respectively, of other blade segments such that the blade segments together form the outer edge, first side and second side of the blade;
means to force the first side of the blade toward the first wall of the groove to removably secure the blade in the groove in proper radial adjustment; and
the groove wall serrations being extending in a direction which is angled with respect to the axis of the cylinder, whereby the angle being such that over the length of the groove the serrations increase in radius by a distance up to the width of one serration, movement of blade segments along the groove wall serrations while engaged therewith moves such blade segments radially outwardly.

29. The sugarcane separation apparatus of claim 28 wherein the angle of the groove wall serrations is such that over the length of the groove the serrations increase in radius by a distance equal to the width of one serration, whereby the blade may be re-positioned after wear by moving the blade segments along the groove wall serrations while in engagement therewith, in the direction of increasing serration radii, by a distance equal to the width of one blade segment, removing the blade segment at one end of the groove, and reinserting it in the other end of the groove as the first segment in the groove in a radial position one serration beyond the others.

30. The sugarcane separation apparatus of claim 29 wherein the blade segments and the serrations are configured and arranged such that each blade segment may be reinserted several times for repeated multiple-stop adjustment along the groove.

31. The sugarcane separation apparatus of claim 30 further including a second cutter roll for removing dermax from the rinds after depithing, such second cutter roll having the same characteristics as the depithing cutter roll, except that the blade segments for the second cutter roll have a lesser radial dimension, whereby used blade segments from the depithing cutter roll can be inserted and reinserted along the groove of the second cutter roll for repeated along the groove of the second cutter roll for repeated multiple-stop adjustments along such groove to thereby to extend the useful life of the blade segments.

* * * * *

UNITED STATES PATENT AND TRADEMARK OFFICE
CERTIFICATE OF CORRECTION

PATENT NO.   : 5,240,192  
DATED        : August 31, 1993  
INVENTOR(S)  : Sydney E. Tilby and Allan Thorn Page 1 of 2

It is certified that error appears in the above-indentified patent and that said Letters Patent is hereby corrected as shown below:

In column 1, line 35, a new paragraph should start after the word "sugar.".

In column 8, line 4, a new paragraph should start after the numeral "84."

In column 8, line 12, after "segment" insert --94--.

In column 8, line 61, change "100a" to --110a--.

In column 12, line 39, claim 28, the subparagraph beginning with "the groove wall" should be replaced with the following:

--the groove wall serrations extending in a direction which is angled with respect to the axis of the cylinder, the angle being such that over the length of the groove the serrations increase in radius by a distance up to the width of one serration, whereby movement of blade segments along the groove wall serrations while engaged therewith moves such blade segments radially outwardly.--

UNITED STATES PATENT AND TRADEMARK OFFICE
CERTIFICATE OF CORRECTION

PATENT NO. : 5,240,192
DATED : August 31, 1993
INVENTOR(S) : Sydney E. Tilby and Allan Thorn It is certified that error appears in the above-indentified patent and that said Letters Patent is hereby corrected as shown below:

In column 13, line 5 and column 14, line 1, delete "along the groove of the second cutter roll for repeated".

Signed and Sealed this

Nineteenth Day of April, 1994

*Attest:*

BRUCE LEHMAN

*Attesting Officer*  Commissioner of Patents and Trademarks